Feb. 22, 1966   R. R. HACKBARTH ETAL   3,236,362
DIVERTER AND OPERATING MECHANISM FOR ARTICLE CONVEYOR
Filed Jan. 10, 1962   5 Sheets-Sheet 5
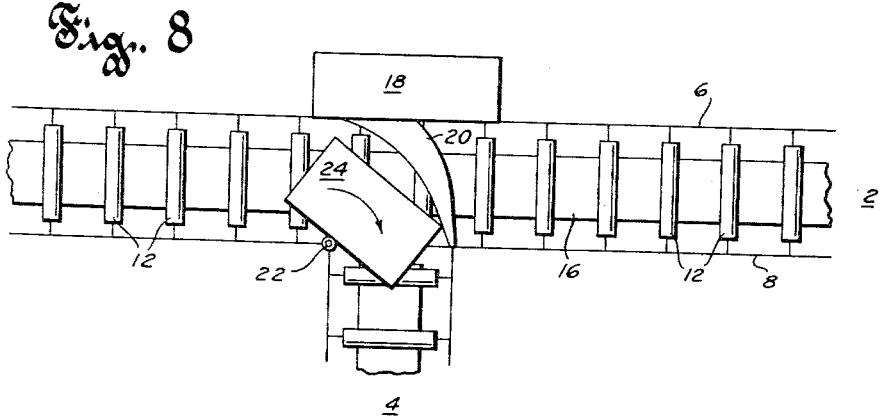
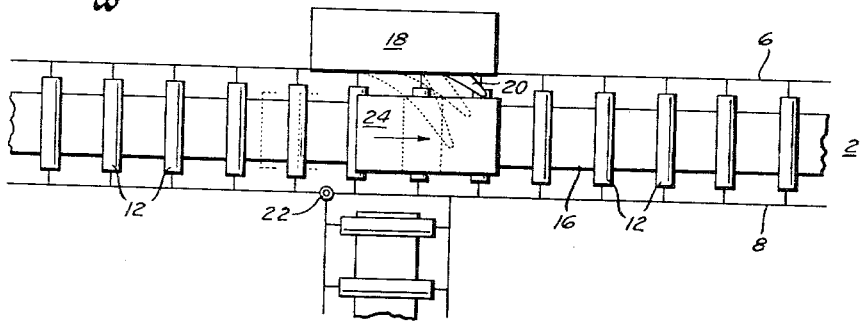
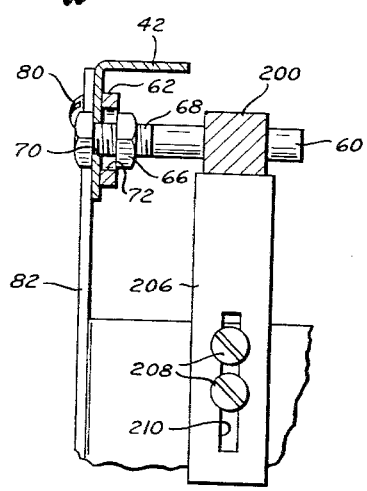

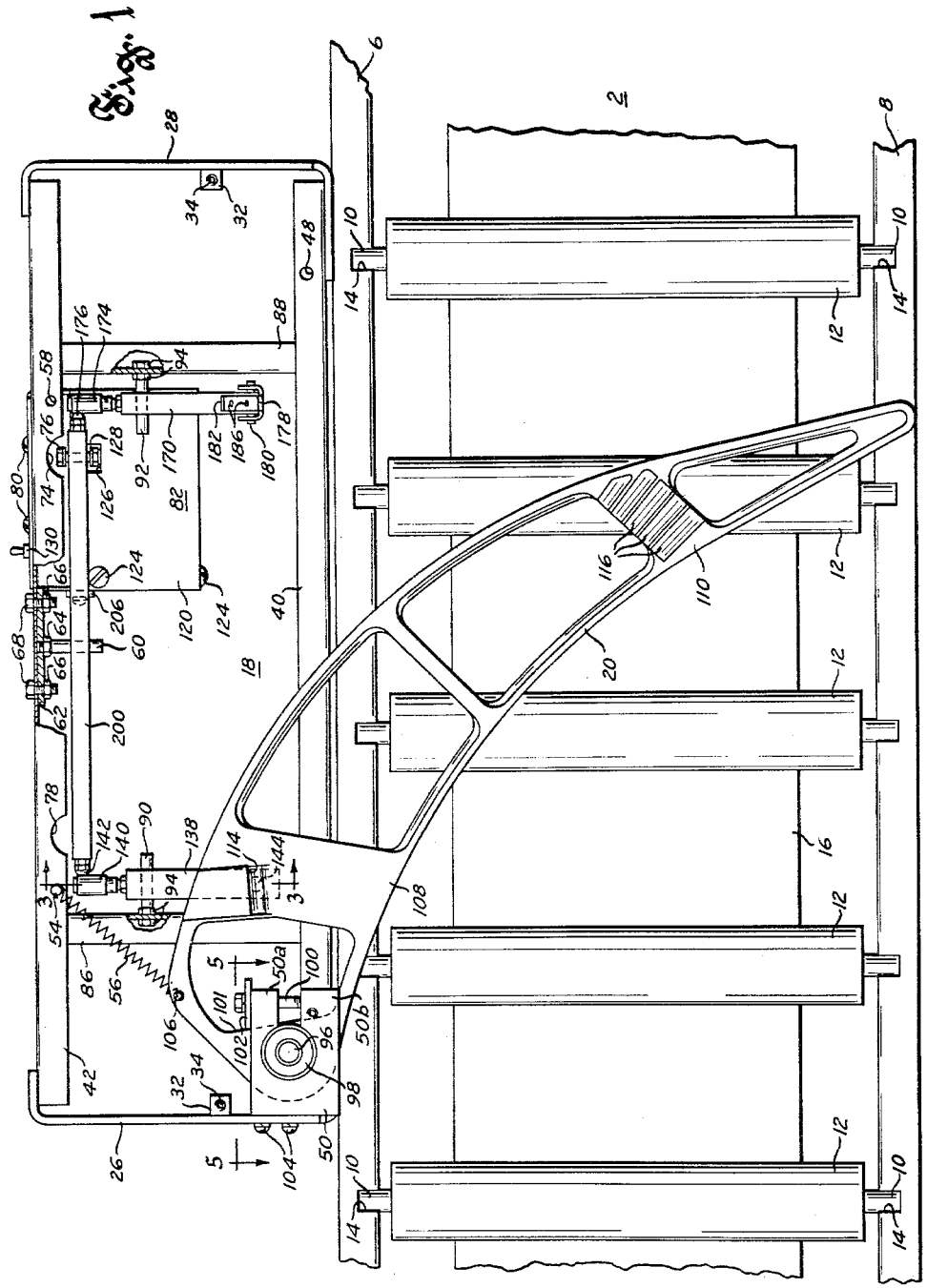

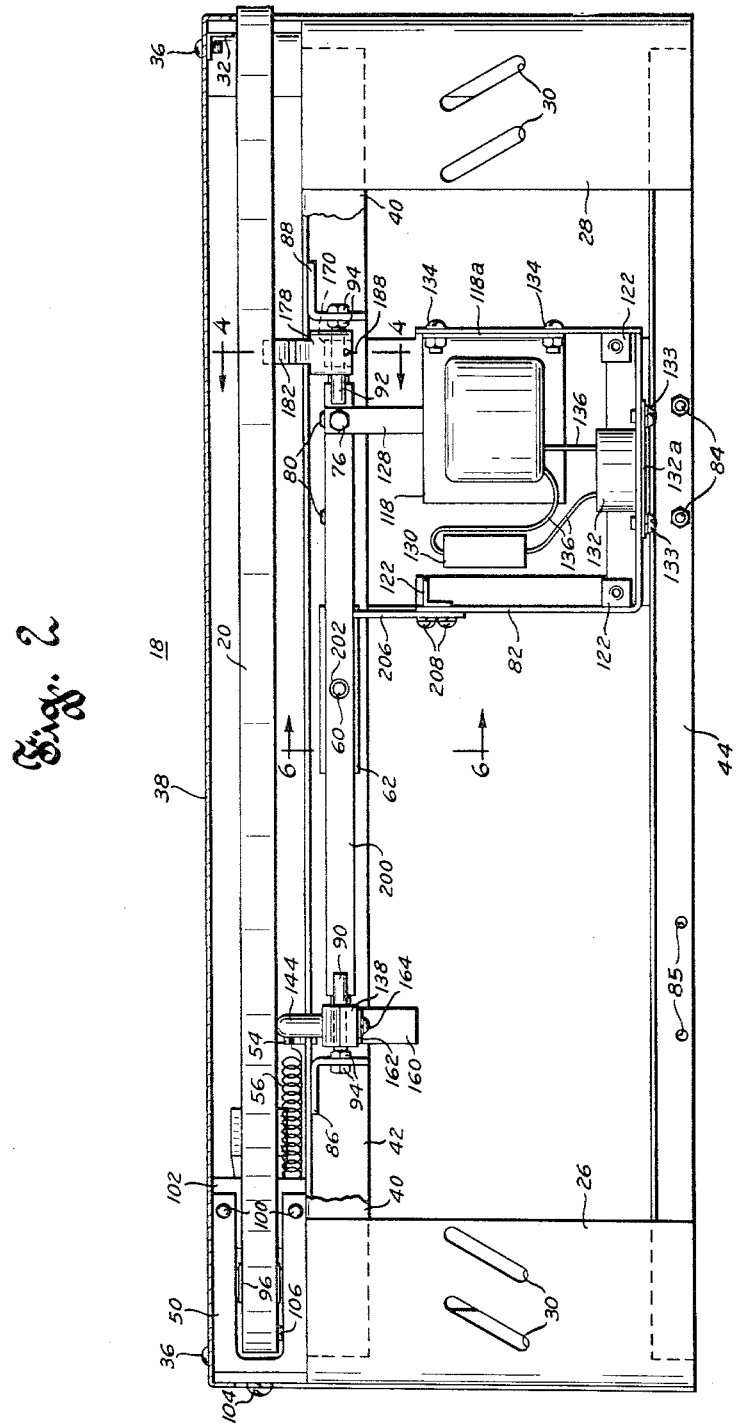

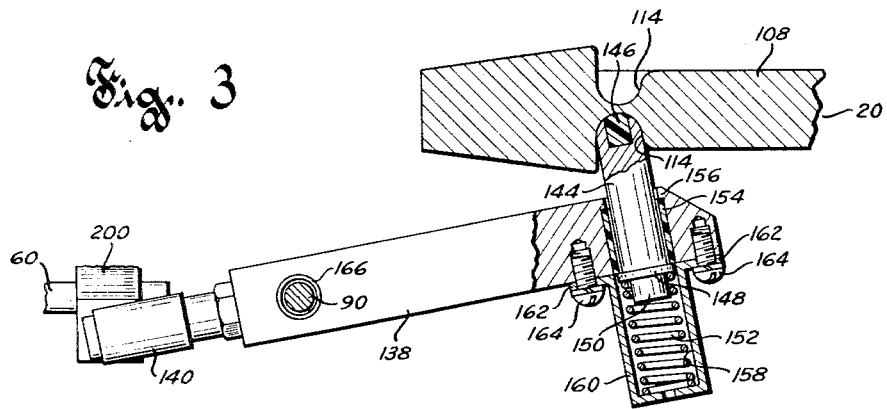
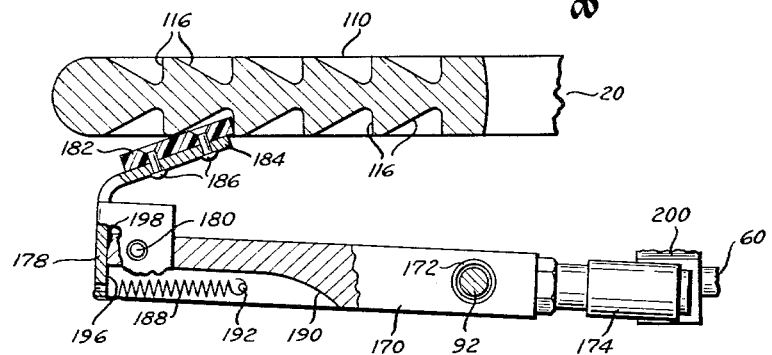
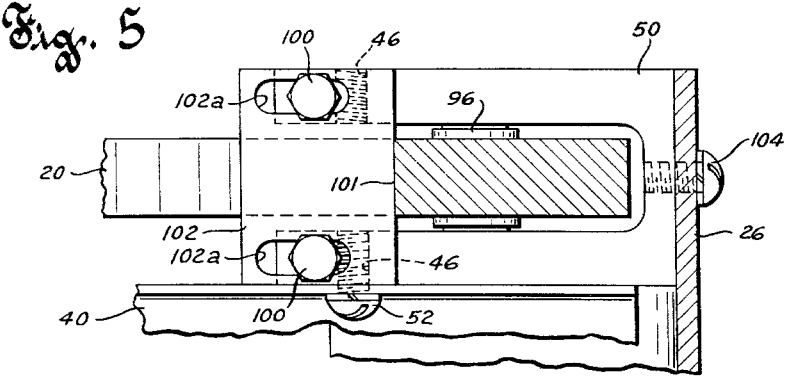

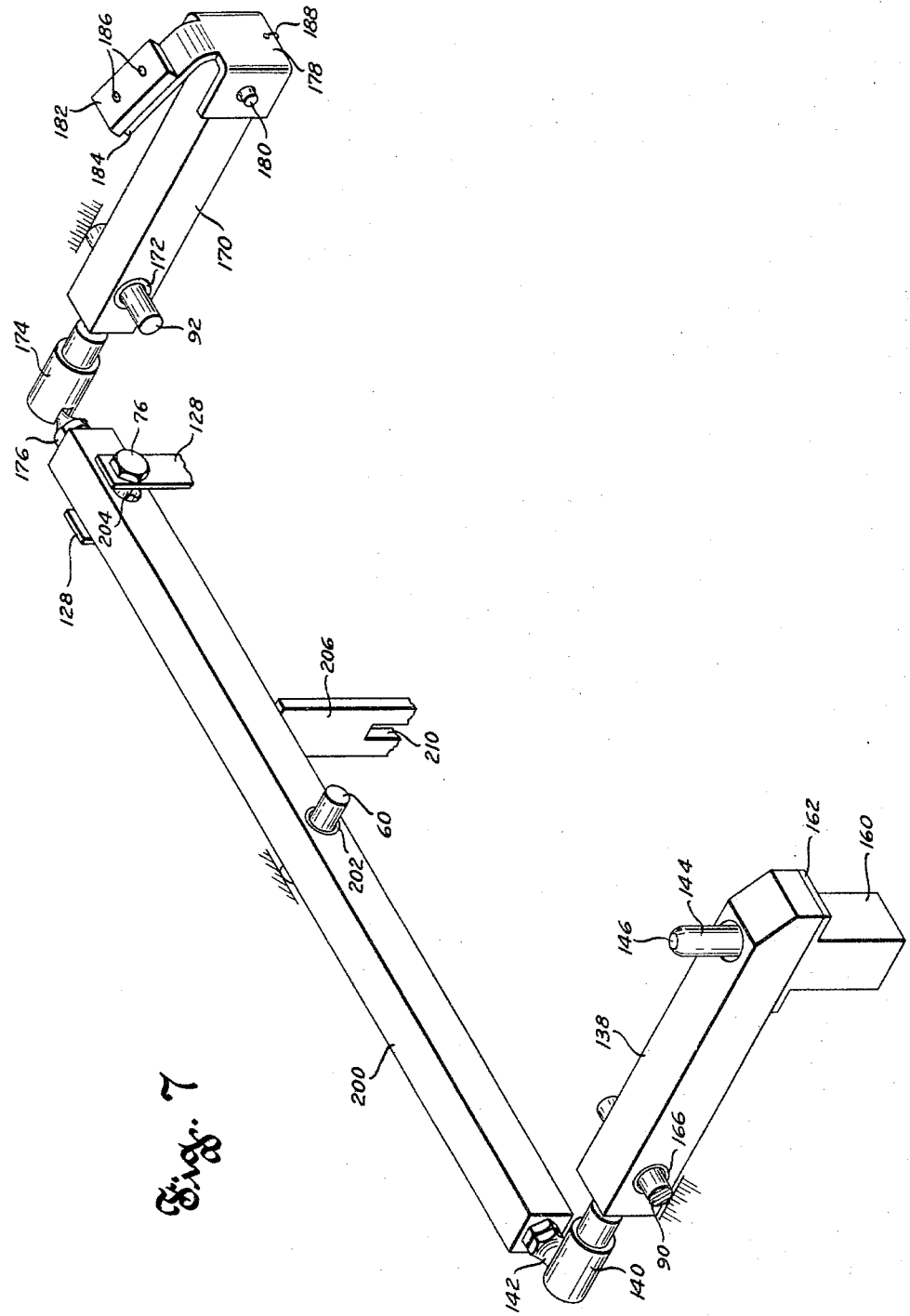

United States Patent Office 3,236,362
Patented Feb. 22, 1966

---

3,236,362
DIVERTER AND OPERATING MECHANISM FOR ARTICLE CONVEYOR
Russell R. Hackbarth, Barney O. Rae, Norbert Sadowski, Thomas P. Shepherd, and Richard D. Winter, Milwaukee, Wis., assignors to Cutler-Hammer, Inc., Milwaukee, Wis., a corporation of Delaware
Filed Jan. 10, 1962, Ser. No. 165,443
1 Claim. (Cl. 198—188)

This relates to an article diverter for conveyors and the like.

A primary object of the present invention is to provide an improved form of diverter mechanism for diverting articles being conveyed.

A more specific object is to provide an article diverter mechanism having a diverter member which will not retract from its diverting position during diversion of a conveyed article but will remain in diverting position until the conveyed article is no longer in contact with the diverter member.

In accordance with the invention there is provided a diverter mechanism consisting of a supporting frame, an electromagnetically operated latching and locking mechanism and a diverter arm which is spring biased to the extended or diverting position. All of the parts of the invention are assembled on a supporting frame to form a unit which is mounted in operating position at the side of a conveyor. The diverter arm is held in its non-diverting or retracted position by a latch. When it is desired that the arm be extended, the electromagnetic actuating means is energized which releases the retracted position latch and moves a diverting position lock into effective position. The diverter arm, being spring biased to the diverting position, then moves to its extended or diverting position and into engagement with the previously mentioned lock. The diverting arm remains locked in this position as long as the electromagnetic actuating means remains energized. When the electromagnetic means is deenergized the lock is released and the latch returns to its effective latching position. The arm is then held in its diverting position only by the biasing spring. The next passing conveyed article which comes into contact with the arm after release of the lock exerts a force on said arm in opposition to the force of the spring and pushes the arm back to its original retracted position, and into engagement with the latch. The cycle may then be repeated by again energizing the electromagnetic actuating means.

Certain features of the device shown herein are claimed in copending applications Serial No. 165,344, by Richard D. Winter, and Serial No. 165,442, Hackbarth, Rae, Sadowski and Winter.

The above mentioned and other objects and advantages of the invention will become more apparent and the invention itself will be best understood by referring to the following description of an embodiment thereof taken in conjunction with the accompanying drawings, wherein:

FIGURE 1 is a top plan view of a portion of an article conveyor and a diverter device which embodies this invention and which has a cover removed to reveal certain operating mechanisms;

FIG. 2 is a front elevation view of the diverter device;

FIG. 3 is a view partially in section and to larger scale taken along line 3—3 of FIG. 1 showing details of a diverter locking assembly;

FIG. 4 is a similar view taken along line 4—4 of FIG. 2, but showing details of a diverter latching assembly;

FIG. 5 is a similar view taken along line 5—5 of FIG. 1 showing a detail of the diverter arm mounting;

FIG. 6 is a similar view taken along line 6—6 of FIG. 2 showing a limit stop;

FIG. 7 is an isometric view of a lever operating assembly for the diverter latch and lock;

FIG. 8 is a schematic showing of the diverting device to reduced scale in position to divert a conveyer article; and FIG. 9 is like FIG. 8, but shows a diverter device in successive non-diverting positions.

In FIG. 1, the diverter device is shown in operating position beside a conveyor 2 upon which articles are normally transported from left to right. The diverter when in the position shown is referred to as a "right-hand" diverter since a conveyed article coming into contact with the diverter arm is diverted in a direction to the right of the conveyed articles' previous direction of travel. A diverter assembled to divert the conveyed article to the opposite side of the conveyor is referred to as a "left-hand" diverter. The conveyor illustrated is of the well known live roller type; however, the invention is equally usable with other types of conveyors. The branch conveyor is not shown in FIG. 1, however, FIGS. 8 and 9 illustrate the position of branch conveyor 4 in relation to the main conveyor 2. Referring again to FIG. 1, the conveyor is provided with members 6 and 8 arranged in parallel relation to serve as side rails of the conveyor. The ends of each axle 10 of rollers 12 are supported in a pair of opposing open topped vertical slots 14 formed in the side rails. The axle is provided with suitably flat sides which engage the sides of the slot to prevent rotation of the axle while rollers 12 are freely rotatable on the axles. The rollers 12 are driven by motor driven endless belt 16 which passes under each roller and is biased into frictional engagement with the drive rollers 12 by a plurality of idler rollers (not shown) mounted under the belt and spaced intermediately between the drive rollers.

As shown best in FIGS. 8 and 9, the diverter unit 18 is attached to the side of main conveyor 2 opposite the branch conveyor 4 so that diverter arm 20 when in the diverting position extends horizontally over the main conveyor at a height suitable to deflect a conveyed article from the main conveyor 2 onto the branch conveyor 4. A freely rotatable guide wheel 22 is mounted on a vertical axis at the juncture of side rails at the entry side of the branch conveyor for guiding conveyed article 24 (FIG. 8) as it is deflected from the main conveyor 2 to the branch conveyor 4.

The diverter mechanism is supported by a framework of welded steel construction. As illustrated in FIGS. 1 and 2 the principal vertical members are the two side plates 26 and 28 which are formed of sheet steel and have a substantially U-shaped horizontal cross section. A pair of diagonal slots 30 (FIG. 2) are cut in the front portion of side plates 26 and 28 for the purpose of fastening the diverter to the side of the main conveyor by means of bolts (not shown). At the top of each side plate there is welded an angle bracket 32 in which there is a threaded hole 34 to receive bolt 36 (FIG. 2) whereby cover 38 (FIG. 2) is fastened to the top of the framework. Extending transversely between the side plates 26 and 28 are three support members 40, 42, 44 made of steel angle. The front support 40 (FIGS. 1 and 2) is fastened at its ends by welding to the inner surfaces near the top of the front portions of end plates 26 and 28. There are two holes 46 (FIG. 5) and 48 (FIG. 1) drilled near the ends of the upper face of front suport 40 for the purpose of fastening a bearing block 50 by means of cap screw 52 (FIG. 5). It will be noted that in the illustrated right-hand configuration only one hold 46 is utilized. The hole 48 at the other end of the front support 40 is used when the diverter is assembled as a left-hand diverter. The reversibility of this and other parts will be more elaborately discussed later. The rear support 42 is welded at its ends to the upper rear portion of the end plates 26 and 28 so that one leg of the steel angle is in a horizontal plane at the top of the support and the other leg is in a vertical position facing the rear of the diverter. In FIG. 1, there is shown a shoulder screw 54 fastened through a hole drilled in the top surface of the rear support. This screw serves as the stationary point of attachment of one end of tension spring 56. When the diverter is assembled in the left-hand configuration, this shoulder screw is fastened through hole 58 near the opposite end of rear support 42 shown in FIGS. 1, 2 and 6. A bearing post 60 is mounted at the mid-point of the rear support 42. This bearing post 60 is threaded into rectangular adjusting plate 62 and secured thereto by locking nut 64 (FIG. 1). The adjusting plate 62 is bolted to rear support 42 by nuts 66 and bolts 68 which pass through holes 70 (FIG. 6) in the rear support 42 and slots 72 (FIG. 6) in adjusting plate 62. As shown in FIG. 6, the slots 62 in the adjusting plate are elongated in the vertical direction to provide for adjustment of the vertical position of bearing post 60. A semicircular recess 74 (FIG. 1) is cut into the inner edge of rear support 42 to provide clearance for the vertical movement of connecting pin 76. A similar recess 78 (FIG. 1) provides the clearance when the diverter is assembled in a left-hand configuration and the location of pin 76 is reversed. There are also provided two pairs of holes (not shown) in rear support 42 to accommodate the two bolts 80 (FIGS. 1 and 8) which fasten a conduit box 82 to the rear support. One pair of bolts 80 is utilized in the right-hand configuration as illustrated and the other pair is used for a left-hand assembly.

The lower support 44 is made of a length of steel angle and is fastened by welding to the side plates 26 and 28 at the lower edge of the diverter directly below the rear support 42. Lower support 44 serves to support the lower edge of the conduit box 82 which is fastened thereto by bolts 84 (FIG. 2). A pair of holes 85 (FIG. 2) are furnished for accommodation of bolts 84 in a left-hand diverter.

Brackets 86 and 88 (FIGS. 1 and 2) made of steel angle of a cross section as shown in FIG. 2 are welded to front support 40 and rear support 42. These brackets serve to furnish support for pivot posts 90 and 92 which are secured to the brackets by nuts 94 tightened against the opposite faces of the bracket on the threaded end portions of the pivot posts which extend through clearance openings in the brackets.

In considering the construction of the supporting framework as heretofore described it should be noted that the left half of the framework is essentially a mirror image of the right half. As the remainder of the mechanism is hereinafter described, it will be seen that this type of construction allows for complete reversibility in that the same parts may be used to construct either a left-hand or a right-hand diverter.

The illustrated embodiment of the invention incorporates a diverter of the arm type, it being understood that application of the invention is not limited to diverters of this type. The diverter arm 20 is preferably a one-piece casting of a tapered arcuate shape as shown in FIG. 1 and is mounted at its wide end root on the base. Arm 20 is non-rotatably supported on a shaft 96. The ends of the shaft 96 are non-rotatably secured to the inner races of anti-friction bearings 98 and the outer races of bearings 98 are non-rotatably secured in bearing block 50, one bearing above the arm and the other below the arm. Bearing block 50 has a generally U-shaped appearance when viewed from the front or rear as shown in FIGS. 2 and 5. A vertical bore passes through both the upper and lower arms of the bearing block to receive the two bearings 98 (FIG. 1). A slot is provided from the edge of the bearing block to the circular bore so that a pair of screws 100 (FIGS. 1 and 5), when tightened, serve to bring portions 50a and 50b closer together and thereby clamp bearings 98 in place. Screws 100 also support stop plate 102. The mounting slots 102a are elongated to provide for lateral adjustment of the stop plate 102 which is positioned so that it touches inner edge 101 (FIG. 5) of arm 20 when arm 20 is in its normal extended position. The function of plate 102 is to prevent accidental over-extension of arm 20. As can also be seen, in FIG. 5, bearing block 50 is bolted both to front support 40 by bolt 52 and to side plate 26 by bolts 104 (FIGS. 1 and 5). The tension spring 56 is attached to the arm 20 by shoulder screw 106 (FIG. 1) and serves to bias the movable arm 20 to the extended position shown in FIG. 1.

Since the top of the arm 20 is a mirror image of the bottom, it is reversible by simply turning it over and may be used as either a left-hand or a right-hand diverter arm. In either case, the concave edge of the arm is the edge which comes in contact with the conveyed article during the process of diversion. This reversible structure of arm 20 is the subject matter of the aforementioned copending application Serial No. 165,442, by Hackbarth et al. On the upper and lower surfaces of transverse cross-members 108 and 110 there are formed locking recesses and latching ratches. FIG. 3 shows a cross-section through crosspiece 108 which illustrates the shape of the locking recesses 114. FIG. 4 illustrates the cross-sectional shape of the ratch surfaces 116 on crosspiece 110.

A conduit box 82 of sheet metal construction serves to enclose the electrical control components and the solenoid 118. As shown in FIG. 2, the conduit box with cover removed is open at its front and top. A generally rectangular sheet of metal 120 (FIG. 1) bent at 90 degrees serves to cover the front and partially cover the top of the conduit box when fastened to angle brackets 122 (FIG. 2) by bolts 124 (FIG. 1). A notch 126 (FIG. 1) is formed in the rear edge of cover 120 to allow for free vertical movement of the solenoid plunger 128. The rear panel of conduit box 82 extends upwardly parallel and in abutting relation to the vertical leg of rear support 42 and is bolted thereto by bolts 80 (FIG. 1). Another portion of the rear panel of conduit box 82 extends downwardly next to the vertical leg of lower support 44 and is fastened thereto by bolts 84 (FIG. 2). A toggle switch 130 is mounted in the rear panel of conduit box 82 and is inserted in the control circuit to provide means at the diverter location for testing the control circuit. In the bottom panel of conduit box 82, there is mounted an electrical socket 132 to which is connected a cable (not shown) which supplies the solenoid actuating current. Bolts 133 serve to fasten the mounting flange 132a of socket 132 to the panel.

The solenoid 118 (FIG. 2) has a plunger 128 which is moved upwardly when electrical current is applied to the solenoid. It is fastened to the right side panel of conduit box 82 by means of bolts 134 (FIG. 2) extending through alined openings in such panel and mounting brackets 118a. The energizing electric current when applied at socket 132 is carried to the solenoid 118 by wire leads 136.

The locking means which holds the diverter arm in the extended position is best illustrated in FIG. 3. The locking arm 138 is a bar of rectangular cross section (FIGS. 2 and 7) with a cylindrical threaded extension (not shown) at one end onto which is attached the socket 140 of a ball joint. The cooperating ball member 142 of the ball joint is inserted into the socket 140 at an approximately right angle as shown in FIGS. 1 and 7. At the opposite end of the arm 138, there is mounted a spring biased locking pin or plunger 144 of a generally cylindrical shape. An insert 146 (FIG. 3) of wear resistant plastic is pressed into a recess formed in the hemispherical upper end of pin 144. Near the lower end of pin 144 there is a circumferential shoulder 148. Immediately below shoulder 148 is a cylindrical portion 150 of reduced radius which serves to accommodate one end of helical compression spring 152. The locking pin 144 is mounted within a cylindrical plastic bearing 154. A shoulder 156 (FIG. 3) at the upper surface of arm 138 prevents bearing 154 from moving upwardly in response to the force exerted by spring 152. Upward movement of pin 144 is limited by shoulder 148 as it comes in contact with the lower surface of bearing 154. Pin 144 as shown in FIG. 3 is in its extreme upward position with respect to arm 138 and it can be seen that pin 144 can be forced downwardly against the bias of spring 152. Spring 152 is mounted within the cylindrical bore 158 of spring retainer 160. The outer surfaces of retainer 160 are rectangular as shown in FIG. 7. At the upper end of retainer 160, there are provided two mounting tabs 162 (FIG. 3) through which pass bolts 164 to secure retainer 160 to arm 138. A cylindrical plastic bearing 166 is securely inserted in a transverse hole in arm 138. Pivot post 90 fits loosely into bearing 166 to form the pivot point for locking arm 138.

Diverter arm 20 is held in its retracted position against the bias of spring 56 (FIG. 1) by the latching means best illustrated in FIG. 4. Latch arm 170 is a bar of rectangular cross section pivotally mounted upon pivot post 92 which passes through cylindrical plastic bearing 172. Ball joint socket 174 is threaded onto a cylindrical threaded extension (not shown) of latch arm 170 and thereby securely fastened to the end of arm 170. The ball member 176 of the ball joint is inserted into the socket 174 at approximately a right angle to the longitudinal axis of arm 170 as shown in FIG. 7. At the opposite end of arm 170, there is a spring biased pawl 178 (FIGS. 4 and 7), which is pivotally mounted upon a shaft 180 which passes transversely through arm 170. A wear resistant plastic wear plate 182 is fastened to the arm 184 of the pawl 178 by means of rivets 186. The arm 184 of the pawl is biased in its normal upward position by tension spring 188 (FIG. 4) located in the longitudinal groove 190 in the lower face of arm 170. One end of spring 188 is fastened to pin 192 within groove 190, and the other end is hooked over the lower edge of the pawl and through a small hole near the lower edge (FIGS. 4 and 7). The movement of pawl 178 in response to the force applied by spring 188 is limited by the engagement of inner surface 196 (FIG. 4) with the end surface of arm 170. As is shown in FIG. 4, there is a relief 198 on the end of arm 170 to permit clockwise rotation of the pawl 178 against the bias of spring 188.

A rocker arm 200 interlocks the locking arm 138 and the latching arm 170 and provides linkage to the solenoid plunger 128. It is pivotally mounted upon pivot pin 60 (FIG. 7) which passes through plastic bearing 202. Ball members 142 and 176 are securely fastened to the ends of rocker arm 200. An elongated slot 204 (FIG. 7) passes transversely through rocker arm 200 to accommodate pin 76 which also passes through the two arms of the U-shaped upper end of plunger 128 of solenoid 118.

A vertically adjustable stop plate 206 (FIGS. 6 and 7) is provided to limit the clockwise rotation of rocker arm 200 as shown in FIG. 2. When the solenoid 118 is not energized the lower edge of rocker arm 200 rests upon the upper edge of stop plate 206 as shown in FIGS. 2 and 6. This plate is fastened to the conduit box 82 by means of bolts 208. An elongated slot 210 (FIG. 6) is provided to allow for vertical adjustment of the stop plate 206.

The operation of the mechanism will now be described. The device in its general aspects of operation is the subject matter, inter alia, of the aforementioned copending Winter application Serial No. 1165,344.

Let it be assumed that diverter arm 20 is in its non-diverting or retracted poistion and that solenoid 118 is de-energized. Under these conditions, the operating mechanism assumes the position shown in FIG. 2. The unsymmetrical distribution of weight, due principally to the mass of plunger 128 at one end of rocker arm 200, causes the rocker arm 200 to rotate about pivot post 60 in a clockwise direction (FIG. 2) until the lower face of rocker arm 200 comes into contact with the upper edge of stop plate 206 (FIGS. 2 and 6). The end of rocker arm 200 which is connected to solenoid plunger 128 is then in its lowest position. Since latching arm 170 is connected to rocker arm 200 through ball 176 and socket 174 (FIG. 7), latching arm 170 rotates about pivot post 92 so that the pawl end of arm 170 moves upwardly. Pawl 178 and its associated wear plate 182 moves upwardly to engage the lower ratch surface 116 on diverter arm 20 (FIG. 4). Referring to FIG. 4, it may be seen that pawl 178 and ratch surface 116 cooperate to restrain diverter arm 20 against clockwise movement toward its diverting position and allow arm 20 to be retracted somewhat further in the counterclockwise direction. If diverter arm 20 is moved further into its retracted position, wear plate 182 is depressed by the teeth of ratch surface 116 (FIG. 4) and pawl 178 rotates about pin 180 against the bias of spring 188 to allow further retraction of arm 20. Clockwise pivoting of arm 20 in response to the force exerted by tension spring 56 is prevented by the engagement of wear plate 182 with the vertical faces of the teeth of ratch surface 116 (FIG. 4). As previously noted pawl 178 is restrained from counterclockwise rotation by the contact of surface 196 with the end of latching arm 170. A force exerted upon arm 20 which would tend to extend arm 20 would also tend to rotate latching arm 170 in a counterclockwise direction about pivot post 170 and thereby tend to lower the pawl end of arm 170 and disengage the pawl. Such a force is resisted principally by the previously mentioned unbalance of the operating mechanism, and it may be seen by tracing the linkage as shown in FIG. 7 that such a force would also tend to move pin 144 upwardly toward the lower surface of crosspiece 108 of diverter arm 20. Since the upper end of pin 144 is close to said surface of arm 20 when the arm is latched as shown in FIG. 2, the force which would tend to extend diverter arm 20 moves pin 144 into contact with the lower surface of arm 20 and said force is eventually transmitted to spring 152 (FIG. 3). It has been found in practice that a spring suitable to provide effective locking bias to locking pin 144 is also sufficiently stiff to resist those forces tending to accidentally unlatch arm 20 that are encountered during normal operation of the diverter.

When the operating mechanism is in the latching position, the end of rocker arm 200 which is connected through ball member 142 and socket 140 to locking arm 138 is in its upper position, and locking arm 138 is rotated about pivot pin 90 so that locking pin 144 is in its lower position as shown in FIG. 2. In this position the rounded upper end of pin 144 is below the lower surface of diverter arm 20 or lightly touching the lower surface. This position of pin 144 may be described as its released position since pin 144 when in this position will not engage locking groove 114 when said groove becomes positioned above the end of pin 144.

When it is desired that a conveyed article approaching the diverter station be diverted laterally upon the main conveyor or onto a branch conveyor, an energizing current is applied to the electrical terminals of socket 132 and is transmitted to solenoid 118 through leads 136 and switch 130. This application of current to solenoid 118 causes plunger 128 to be moved upwardly. Referring to FIG. 2, rocker arm 200 is rotated in the counterclockwise direction since pin 76 connects plunger 128 to the right end of rocker arm 200. This motion is transmitted through the ball joints at the ends of rocker arm 200 (FIG. 7) to the latching arm 170 and the locking arm 138. Latching arm 170 and locking arm 138 are in turn rotated about their respective pivot posts 92 and 90 so that pawl 178 is lowered and locking pin 144 is biased upwardly by compression spring 152 (FIG. 4) against the lower surface of crosspiece 108 (FIG. 1) of diverter arm 20. As pawl 178 moves downwardly, the wear plate 182 disengages the teeth of ratch surface 116. Since the contact of pin 144 with the flat lower surface of arm 20 produces very little restraint to the movement of arm 20, diverter arm 20 and shaft 96 are free to pivot in the bearings 98 (FIG. 1) toward its diverting position in response to the force exerted by tension spring 56 (FIG. 1). As diverter arm 20 moves toward its diverting position, the lower surface of crosspiece 108 slides over the upper end of locking pin 144 and holds pin 144 partially depressed against the bias of spring 152. When diverter arm 20 reaches its diverting position as shown in FIG. 1, locking recess 114 reaches a position directly over the end of pin 144, and pin 144 being biased upwardly by spring 152 slides upwardly into groove 114 as shown in FIG. 3 thereby stopping the motion of arm 20 and locking it in its diverting position. As pin 144 engages recess 114, the inner surface 101 of arm 20 simultaneously touches the edge of stop plate 102 as shown in FIGS. 1 and 5. However, the primary purpose of stop plate 102 is not to brake the extending motion of arm 20 but to prevent outward motion of arm 20 after locking pin 144 is retracted from groove 114 preceding retraction of arm 20.

As long as solenoid 118 remains energized pin 144 will remain in engagement in recess 114 and diverter arm thereby remains locked in diverting position and will deflect conveyed articles 24 from the main conveyor 2 to branch conveyor 4 as shown in FIG. 8. If solenoid 118 should be deenergized during deflection when an article is still in contact with arm 20 as shown in FIG. 8, arm 20 will not unlock since the friction of the mechanical system, principally the friction of pin 144 against the edge of recesses 114, is sufficient to overcome the unbalance of the mechanism and prevent rotation of locking arm and consequent disengagement of pin 144 from recess 114 until the conveyed article no longer exerts a force upon arm 20.

When it is desired that diversion be discontinued, the solenoid energizing current is terminated, and the previously described unbalance of the operating mechanism due principally to the mass of plunger 128 causes the locking and latching arms to rotate so that locking pin 144 drops out of groove 114 and and pawl 178 rises to a position where it will engage the teeth of ratch surface 116 when arm 20 is retracted. After pin 144 disengages groove 114, arm 20 is held in its extended position against stop plate 102 by tension spring 56. The next conveyed article to come into contact with arm 20 exerts a force on arm 20 which overcomes the bias of spring 56 and pushes arm 20 back to its retracted position as shown in FIG. 9. The conveyed article then continues on a straight path down the main conveyor past the diverter. As arm 20 is retracted, the teeth of ratch surface 116 engage pawl 178, and arm 20 is thereby held in retracted position until the solenoid is again energized. The pawl 178 may engage any one of the plurality of teeth on ratch surface 116 depending upon how far arm 20 is pushed by the conveyed article. This plurality of teeth provides for variation in the size of the conveyed article or on its lateral position upon the conveyor. If a succeeding conveyed article should happen to strike the retracted arm 20, the arm might be further retracted so that pawl 178 might engage another tooth. However, this occurrence would in no other way effect operation of the diverter.

When diversion of one or more conveyed articles is again desired, the cycle of operation is repeated by energization of solenoid 118.

While the apparatus hereinbefore described is effectively adapted to fulfill the objects stated, we do not intend to confine our invention to the particular preferred embodiment of diverter device and operating mechanism disclosed, inasmuch as it is susceptible of various modifications without departing from the scope of the appended claim.

We claim:

In a mechanism for selectively diverting articles being conveyed, a member biased for movement to one position wherein it is effective to divert articles and movable against its bias to a non-diverting position, means for locking said member in said one position comprising a lock element and a mechanical operating means therefor, said lock element being extendable to a locking position to engage said member to thereby prevent movement of said member, means for latching said member in said non-diverting position, means operable to release said latching means and render said locking means effective to permit said member to move to and be locked in said one position and also operable to release said locking means and render said latching means effective so that said member can be moved to and be latched in said non-diverting position by articles being conveyed, and a means which operates the means operable to release said locking means and which produces an operating force of such a low magnitude as to be ineffective to cause release of said locking means against the increased frictional resistance to movement of the locking means occurring during diversion of said conveyed article, said increased frictional resistance to movement being produced in the said locking means by increased contact pressure between said lock element and said member and between engaging members of said mechanical operating means when said conveyed article exerts a force against said member during diversion of said conveyed article.

References Cited by the Examiner
UNITED STATES PATENTS

| | | | |
|---|---|---|---|
| 1,011,086 | 12/1911 | Smith | 246—315 |
| 1,563,446 | 12/1925 | Sholtz. | |
| 1,688,529 | 5/1928 | Jennings. | |

SAMUEL F. COLEMAN, *Primary Examiner.*

JULIUS E. WEST, HUGO O. SCHULZ, *Examiners.*